United States Patent
Kokami et al.

(10) Patent No.: US 6,975,479 B2
(45) Date of Patent: Dec. 13, 2005

(54) MAGNETIC DISC STORAGE APPARATUS

(75) Inventors: Yasuhiko Kokami, Takasaki (JP);
Kenji Nishimura, Takasaki (JP);
Tatsuya Negishi, Fujioka (JP)

(73) Assignee: Renesas Technology Corp., Tokyo (JP)

( * ) Notice: Subject to any disclaimer, the term of this patent is extended or adjusted under 35 U.S.C. 154(b) by 289 days.

(21) Appl. No.: 10/144,035

(22) Filed: May 14, 2002

(65) Prior Publication Data

US 2002/0181142 A1 Dec. 5, 2002

(30) Foreign Application Priority Data

May 30, 2001 (JP) .................................. 2001-161854

(51) Int. Cl.[7] .............................................. G11B 5/596
(52) U.S. Cl. ................................ 360/77.02; 360/78.04
(58) Field of Search ........................ 360/61, 75, 77.01, 360/77.02, 77.04, 77.07, 78.01, 78.04, 78.05, 78.09, 78.12

(56) References Cited

U.S. PATENT DOCUMENTS 5,838,515 A * 11/1998 Mortazavi et al. ....... 360/78.12
6,021,015 A * 2/2000 Jeffrey et al. ................. 360/69
6,501,609 B2 * 12/2002 Saito et al. .................... 360/61
2002/0071199 A1   6/2002 Kokami et al. .......... 360/77.02

FOREIGN PATENT DOCUMENTS

JP         9-121591       5/1997
JP        11-122954       4/1999

* cited by examiner

Primary Examiner—David Hudspeth
Assistant Examiner—Jason Olson
(74) Attorney, Agent, or Firm—Miles & Stockbridge P.C.

(57) ABSTRACT

There is provided a technique for controlling drive of a voice coil motor which can select, with priority for effective reduction, any one of heat generation and EMI noise which are presumed to induce a read/write error and for simultaneously realizing the positioning control of magnetic head with higher accuracy during the tracking operation and the high speed access with shortening of the seek operation period. The magnetic disc storage apparatus introducing this technique is provided with a mode to drive with linear control a coil of the voice coil motor from both terminals and a mode to drive one terminal of coil with linear control and the other terminal with pulse width control. Thereby, the coil is driven in the drive mode of linear control during the tracking operation, while one terminal of coil is driven with linear control and the other terminal with pulse width control during the seek operation.

8 Claims, 6 Drawing Sheets

MAGNETIC DISC STORAGE APPARATUS

BACKGROUND OF THE INVENTION

The present invention relates to a control technique of a magnetic disc storage apparatus and more specifically to a control technique of a voice coil motor for moving a magnetic head to read or write information from or to the storage track on a magnetic storage disc to be driven to rotate. A voice coil motor control technique has been disclosed in the patent application presented by the applicants of the present invention filed on Dec. 12, 2001 Ser. No. 10/012,401).

A magnetic disc storage apparatus comprises a magnetic head for reading or writing information from or to a storage track on a magnetic storage disc to be driven to rotate, a voice coil motor for moving this magnetic head on the magnetic disc and a voice coil motor drive controller for positioning the magnetic head by controlling a voice coil motor drive current while monitoring the read condition of the magnetic head.

Information storage density of a magnetic disc storage apparatus has been improved from year to year and thereby still higher accuracy has also been required for the positioning control of the magnetic head. Therefore, it has been proposed that the magnetic head is positioned through the feedback control of a drive current of the voice coil motor on the basis of a detected value of the relevant drive current. In order to drive the voice coil motor for moving the magnetic head, a linear drive system has been employed in which amount of a voice coil motor drive current is continuously changed.

SUMMARY OF THE INVENTION

However, the inventors of the present invention have made it apparent that the technique explained above contains following problems.

Namely, a magnetic disc storage apparatus is requested to assure higher access rate together with high storage density. In order to realize higher access rate, a time required to move a magnetic head to the predetermined storage track, so-called a seek time must be shortened but this purpose will bring about increase of a voice coil motor drive current. However, when a voice coil motor drive current increases, loss of the power for linear control of the drive current also increases and thereby amount of heat generated increases. Heat generated during the seek operation will give adverse effect to operations and characteristics of magnetic head and magnetic storage disc and accordingly a harmful event, for example, a read/write error may be generated easily.

Therefore, the inventors of the present invention have investigated in order to reduce such heat generation that a voice coil motor drive current is controlled through the pulse width modulation (hereinafter, referred to as the PWM control). Namely, the inventors have investigated a pulse drive system in which drive of the voice coil motor is controlled by changing a feeding/non-feeding time ratio of the drive current in place of continuous change in amount of a voice coil motor drive current. In this case, drive control of the voice coil motor is executed by fixing amount of the voice coil motor drive current to a value near the maximum value to change the current feeding/non-feeding time ratio.

However, it has been proved that this pulse drive system is surely effective for control in amount of heat generation through reduction of power loss but provides the problems that it is difficult to assure sufficient magnetic head positioning accuracy during the tracking process in which control accuracy, particularly, amount of movement of magnetic head is smaller than that in the linear drive system explained above and that a fear for generation of tracking mistake becomes larger due to introduction of a read error of the position information because EMI (Electro-Magnetic Interference) noise generated by pulse control of the drive current enters the magnetic head and wirings.

However, a system utilizing the voice coil motor includes the system which is required to particularly control the amount of heat generation because it is influenced easily by heat generation rather than noise and the system which is required to particularly control the noise because it is influenced easily by EMI noise rather than heat generation. Therefore it has been required to develop a motor control technique which can cover the requirements of both systems utilizing the voice coil motor.

It is therefore an object of the present invention to provide a voice coil motor drive control technique which can selectively and effectively reduce with preference any one of heat generation or EMI noise which will probably generate a read/write error and can also realize high access rate through high accuracy of magnetic head positioning control and reduction of seek time during the tracking process.

The aforementioned and the other objects and features of the present invention will become apparent from the description and the accompanying drawings of this specification.

A summary of typical aspects of the present invention will be explained below.

Namely, there is provided a magnetic disc storage apparatus comprising a magnetic head for reading information from a storage track of a magnetic storage disc driven to rotate, a voice coil motor for moving this magnetic head on the disc, a head driving means for executing positioning control of the magnetic head through the feedback control of a drive current of the voice coil motor while monitoring the read condition of the magnetic head, wherein the magnetic head driving means provides a first drive mode for driving both terminals of a coil of the voice coil motor with the linear control and a second drive mode for driving one terminal of the coil with the linear control and driving the other terminal with the pulse width control.

According to the means explained above, since the second drive mode is provided in which one terminal of the coil of the voice coil motor is driven with the linear control, while the other terminal with the pulse width control, the head can be moved at a high speed with the power loss which is less than that of the case where the coil is driven from both terminals with the linear control and moreover the head can also be moved while generation of noise can further be controlled more than that when the coil is driven from both terminals with the pulse width control.

Moreover, it is more preferable that the magnetic head drive means is constructed to execute the first drive mode during the tracking process in which the magnetic head sequentially scans the adjacent storage tracks and also executes the second drive mode during the seeking process in which the magnetic head moves over the storage tracks. Thereby, high speed access can be realized while the magnetic head positioning accuracy in the tracking process can be improved and the generation of noise in the seeking process can be controlled.

It is still further preferable that the magnetic head driving means is constructed to execute the first drive mode when a control command value of the voice coil motor drive current is less than the predetermined threshold value and execute the second drive mode when the control command value of the voice coil motor drive current is equal to or higher than the predetermined threshold value. Therefore, the first drive mode and the second drive mode can easily be changed over based on the control command value.

There is further provided a magnetic disc storage apparatus comprising a magnetic head for reading information from a storage track on a magnetic storage disc to be driven to rotate, a voice coil motor for moving the magnetic head on the disc and a magnetic head driving means to execute the positioning control of the magnetic head through the feedback control of a voice coil motor drive current while monitoring the read condition of the magnetic head, wherein the magnetic head driving means is provided with a first drive mode for driving both terminals of the coil of the voice coil motor with linear control, a second drive mode for driving one terminal of the coil with linear control and the other terminal with pulse width control and a third drive mode for driving both terminals of the coil with pulse width control and the voice coil motor is driven and controlled in any one of the above drive modes.

According to the means explained above, since the second drive mode is provided in which one terminal of the coil of voice coil motor is driven with linear control, while the other terminal with pulse width control, the head can be moved with power loss which is less than that when both terminals of coil are driven with linear control and moreover the head can also be moved while generation of noise is controlled more than that when both terminals of coil are driven with pulse width control. In addition, since the third drive mode is provided in which both terminals of the coil of voice coil motor are driven with pulse width control, the head can be moved at a higher speed with power loss which is less than that of the second drive mode. Moreover, since a user can select, depending on the characteristics of the own system, any one of the second drive mode resulting in less noise and the high speed third drive mode resulting in less power loss, system operation can be optimized easily.

It is preferable that a timing control means is provided for setting the timing in which an instantaneous value of the voice coil motor drive current becomes equal to the average value thereof and the drive mode is changed over in synchronization of the timing explained above which is determined by the timing control means. Thereby, smooth transfer between the first drive mode and the second drive mode can be realized.

It is still further preferable that the magnetic disc storage apparatus comprises a current detecting means for detecting an average value of the voice coil motor drive current through the voltage conversion, an error detecting circuit for detecting a difference between the detected voltage of the current detecting means and a control command value, a first pulse generating circuit for generating a first pulse which changes in the width depending on the detected output of the error detecting circuit, a second pulse generating circuit for generating a second pulse which is different in the phase from the first pulse based on the detected output of the error detecting circuit, a first drive means for controlling a voice coil motor drive current from the first terminal side of the coil based on the detected output of the error detecting circuit or the first pulse generated by the first pulse generating circuit, a second drive means for controlling a voice coil motor drive current from the second terminal side of the coil based on the detected output of the error detecting circuit or the second pulse generated by the second pulse generating circuit, a first switch circuit for supplying the detected output of the error detecting circuit or the first pulse to the first drive means through the change-over operation between them depending on the operation mode, and a second switch circuit for supplying the detected output of the error detecting circuit or the second pulse to the second drive means through the change-over operation between them depending on the operation mode, in which the first switch circuit and the second switch circuit may be independently controlled. Thereby, the coil of motor can be driven in the desired operation mode using a common circuit only by changing over the first switch circuit and the second switch circuit depending on the designated operation mode and moreover since the first switch circuit and the second switch circuit can be independently controlled, three or more operation modes can be changed over depending on the conditions of the switches.

Moreover, there is also provided a magnetic disc storage apparatus which is constructed so that a signal which is read with the magnetic head, a write signal to be supplied to the magnetic head, a signal to drive one terminal of the coil and a signal to drive the other terminal of the coil are transmitted with only one transmission medium, wherein a wiring for transmitting the signal for driving the other terminal of the coil which is controlled by pulse width control in the second drive mode is allocated, on the transmission medium, at the position isolated from the wiring for transmitting the read signal and write signal more than the wiring for transmitting the signal for the other terminal of the coil which is controlled by linear control in the second drive mode. Thereby, noise generated from the wiring for transmitting the signal to drive the motor cannot easily enter the wiring for transmitting the read signal and write signal.

It is more preferable that a wiring for supplying a power source voltage to the voice coil motor is allocated among the wiring for transmitting the signal to drive the other terminal of the coil which is controlled by pulse width control in the second drive mode, the wiring for transmitting the signal to drive one terminal of the coil which is controlled by linear control in the second drive mode and the wiring for transmitting the read signal and write signal. Thereby, it is still further difficult for the noise generated from the wiring for driving the motor to enter the wiring for transmitting the read signal and write signal.

DETAILED DESCRIPTION OF THE PREFERRED EMBODIMENTS

The preferred embodiments of the present invention will be explained with reference to the accompanying drawings.

Figure 1:
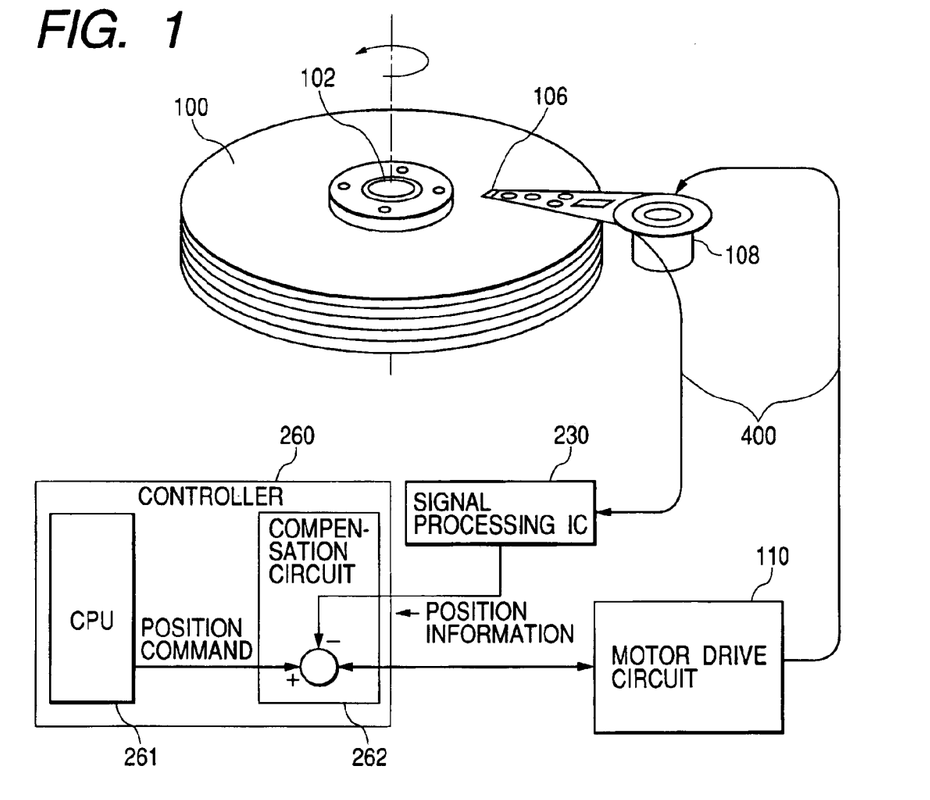
FIG. 1 is a block diagram showing the outline of the magnetic disc storage apparatus to which the present invention is applied.

FIG. 1 is a schematic diagram of a magnetic disc storage apparatus to which the technique of the present invention is adapted.

The magnetic disc storage apparatus shown in FIG. 1 comprises a magnetic storage disc 100, a spindle motor 102 for driving the magnetic storage disc 100 to rotate, a magnetic head 106 for writing and reading information to and from the storage track on the magnetic storage disc 100, a voice coil motor 108 for moving the magnetic head 106 in the radius direction on the disc 100, a motor drive circuit 110 for driving this voice coil motor 108, a signal processing circuit (signal processing IC) 230 for reading position information from the signal read from the magnetic head 106 and a controller 260 for sending a drive current command value to the motor drive circuit 110 based on the position information read by the signal processing circuit 230.

Here, the controller 260 comprises a microcomputer (CPU) 261 for controlling the operations of the magnetic disc storage apparatus and a compensation circuit 262 for generating a drive current command value based on both the position command (target track position information) from the microcomputer 261 and the head position information from the signal processing circuit 230. The drive current command value generated by the compensation circuit 262 is then sent to the motor drive circuit 110 as explained above.

Figure 2:
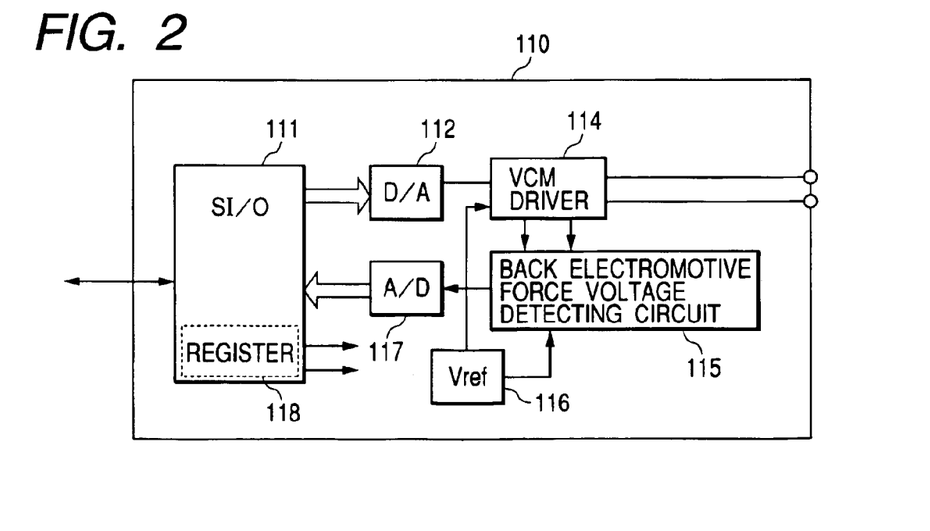
FIG. 2 is a block diagram showing a construction example of a voice coil motor drive circuit to form the magnetic disc storage apparatus to which the present invention is applied.

The motor drive circuit 110 comprises, as shown in FIG. 2, a serial port 111 for transmitting or receiving in serial the data to or from the controller 260, a D/A converter 112 for converting a drive current command value sent as a digital data from the controller 260 into an analog drive current command value, a VCM driver 114 for feeding a drive current to the voice coil motor 108 based on the analog drive current command value, a back electromotive force voltage detecting circuit 115 for detecting a back electromotive force voltage induced by a coil of the voice coil motor 108, a reference voltage generating circuit 116 for generating the reference voltage Vref required for the back electromotive force voltage detecting circuit 115 and the VCM driver 114 and an AD converting circuit 117 for converting the back electromotive force voltage detected by the back electromotive force voltage detecting circuit 115 with the AD conversion. The back electromotive force voltage converted to a digital data with the AD converting circuit 117 is then sent to the controller 260 via the serial port 111 and thereby the controller 260 recognizes a head moving speed from the received back electromotive force voltage.

Moreover, the controller 260 instructs the motor drive circuit 110 to operate in the mode depending on the moving velocity and the VCM driver 114 drives the voice coil motor 108 depending on the designated operation mode. In more practical, during the read or write operation in which amount of movement of the magnetic head 106 is rather small, the VCM driver 114 linearly controls the drive current of the voice coil motor 108. Thereby, the "linear drive mode" is designated and the operation is executed by the VCM driver 114. Moreover, during the seek operation in which amount of movement of the magnetic head 106 is comparatively large, the "pulse drive mode" in which coil terminals of the voice coil motor 108 are driven from both directions with the PWM drive method or the "single side pulse drive mode" in which one terminal of coil is driven with the PWM drive method and the other terminal is linearly driven is designated, and the VCM driver 114 executes the current control of motor depending on the designated mode.

Contents of each operation mode will be explained later in detail. The serial port 111 is provided with a mode register 118 for setting each mode and the controller 260 can select any operation mode by setting the code for designating the mode to a mode register 118.

Moreover, the controller 260 discriminates, with the predetermined threshold value, a level of the drive current value indicated by the drive current command value generated by the compensation circuit 262 and sends a mode designation code MODE, based on the result of this level discrimination and mode information which is previously designated with a user, to the motor drive circuit 110 to set this code to the mode register 118 within the serial port 111. This mode designation code MODE instructs the "linear drive mode" when the drive current command value generated by the compensation circuit 262 is less than the predetermined threshold value and also instructs, with selection by a user, the "pulse drive mode" or "single side pulse drive mode" when the drive current command value is equal to or higher than the threshold value. The VCM driver 114 is constructed to execute the operations through the switching to any one of the "linear drive mode", "pulse drive mode" or "single side pulse drive mode" depending on the mode designation code MODE.

Since the magnetic drive head system as explained above is provided , a voice coil motor drive current is linearly controlled during the tracking operation in which amount of movement of the magnetic head 106 is rather small and thereby higher positioning accuracy can be obtained. Meanwhile, when the "pulse drive mode" is selected during the seek operation mode in which amount of movement of the magnetic head 106 is rather large, a drive current of the voice coil motor is PWM-controlled from both terminals of coil and thereby the magnetic head 106 can be moved in higher speed without large power consumption. Moreover, when the "single side pulse drive mode" is selected, the drive current of the voice coil motor is PWM controlled from one terminal of the coil and is linearly controlled from the other terminal. Therefore, the head is moved in the intermediate speed of that in the "linear drive mode" and "pulse drive mode" with the power loss equal to the intermediate value of that in such two modes. As a result, the magnetic head 106 can be moved in a rather higher speed while the power loss is controlled.

Thereby, while heat generation or EMI which induce a read/write error can be reduced effectively, higher accuracy in the magnetic head positioning control during the tracking operation and high speed access through reduction of seek time can be attained. In other words, in the magnetic head drive system, the "linear drive mode" is executed during the tracking operation in which the magnetic head 106 traces the predetermined storage track in the read/write condition and high speed access and control of EMI noise in the seek operation can be optimized depending on the system, while positioning accuracy of magnetic head during the tracking operation is improved, by executing the "pulse drive mode"

or "single side pulse drive mode" during the seek operation in which the magnetic head 106 moves bridging over the storage tracks.

Figure 3:
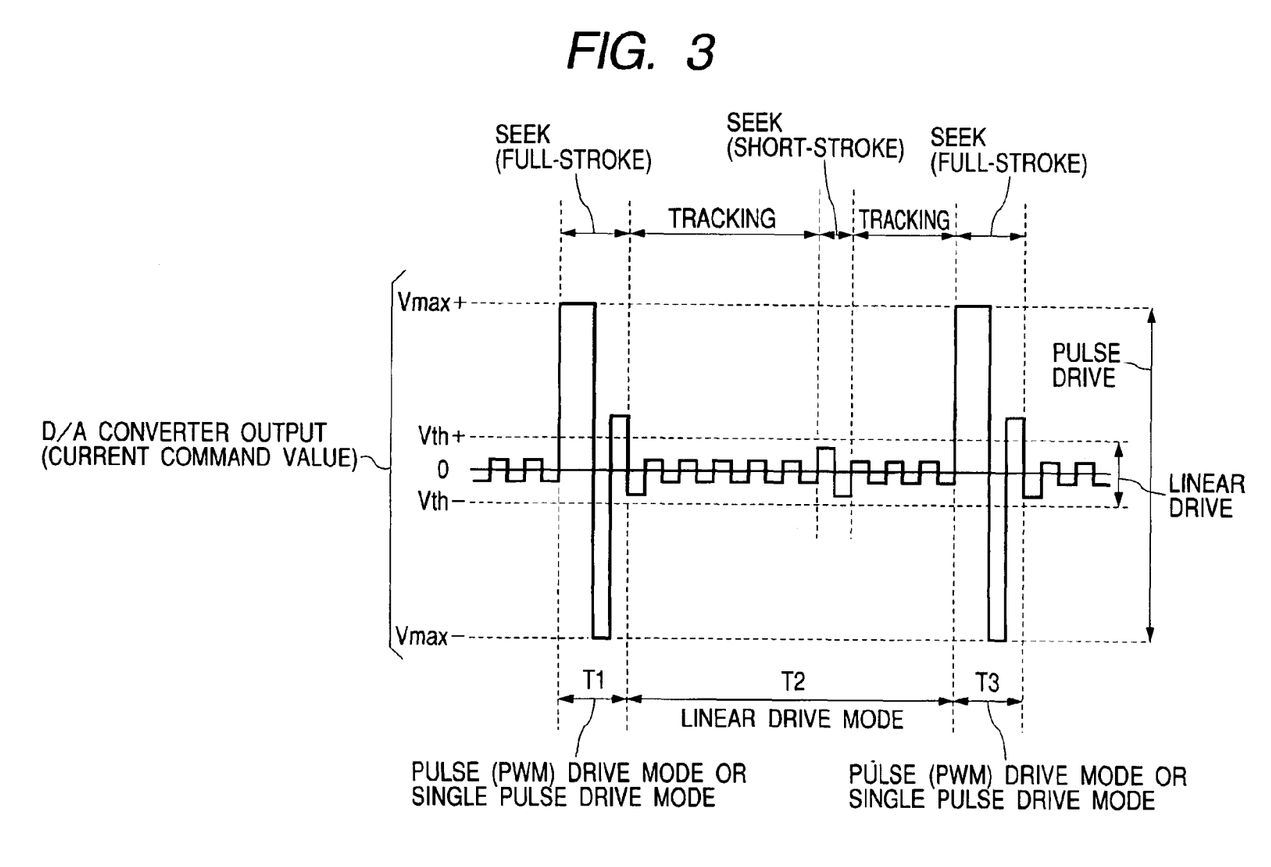
FIG. 3 is a timing chart showing a relationship between the current command values during the seek mode and the tracking mode of the voice coil motor drive circuit shown in FIG. 2.

FIG. 3 is a timing chart showing a relationship between a current command value in the seek operation of the motor drive circuit 110 of FIG. 2 and a current command value during the tracking operation.

As shown in FIG. 3, since a large amount of movement of the magnetic head 106 is required during the seek operation (period T1 in FIG. 3), the controller 260 generates, depending on such movement, the drive current command value of the full-range, namely, of the maximum scale (Vmax+/Vmax−). This command value (Vmax+/Vmax−) is converted to an analog value with the D/A converter 112 and is then applied to the VCM driver 114. Here, the VCM driver 114 executes the pulse drive mode for PWM control of the drive current to be applied to the voice coil motor 108 to result in the matching between the average drive current of the voice coil motor 108 and the command value. Since the drive current command value is set to Vmax+, the magnetic head 106 is driven for the seek operation in the higher speed and thereafter when the drive current command value is set to Vmax−, the movement of head is braked.

When the magnetic head 106 is driven for the seek operation and comes close to the target storage track, the required amount of movement of the magnetic head 106 becomes small. Therefore, the value of drive current command generated from the controller 260 is reduced depending on such amount of movement and therefore a value of the analog drive current command value outputted from the DA converter 112 is also reduced more than Vmax+. When a value (absolute value) of this drive current command becomes less than the predetermined threshold value (Vth), the drive mode is changed to the linear drive mode from the pulse drive mode (or single side pulse drive mode). Thereby, the VCM driver 114 executes the linear drive mode in which the drive current of the voice coil motor 108 becomes equal to the command value through the linear control in order to execute the tracking operation (period T2 of FIG. 3) in which the magnetic head 106 is controlled for the positioning in the higher accuracy.

Figure 4:
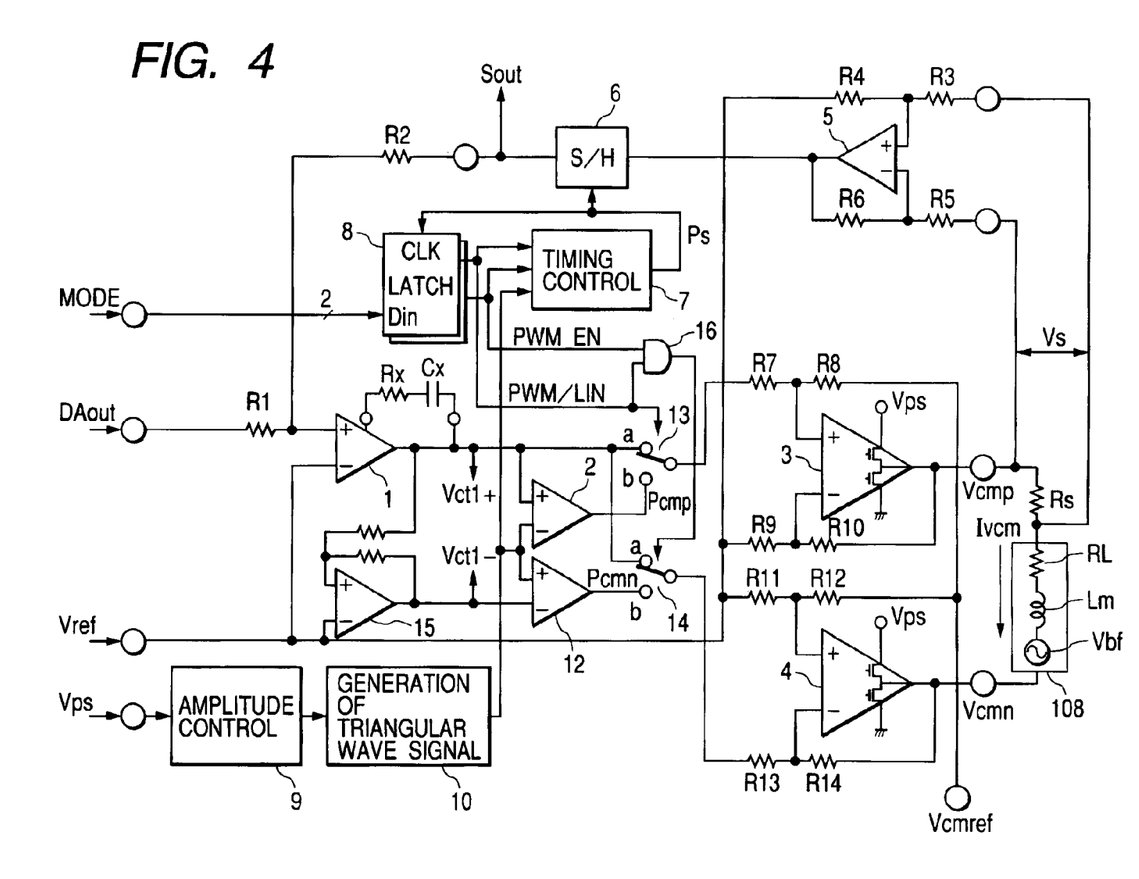
FIG. 4 is a construction diagram of the circuit showing an embodiment of a VCM driver applied in the present invention.
Figure 5:
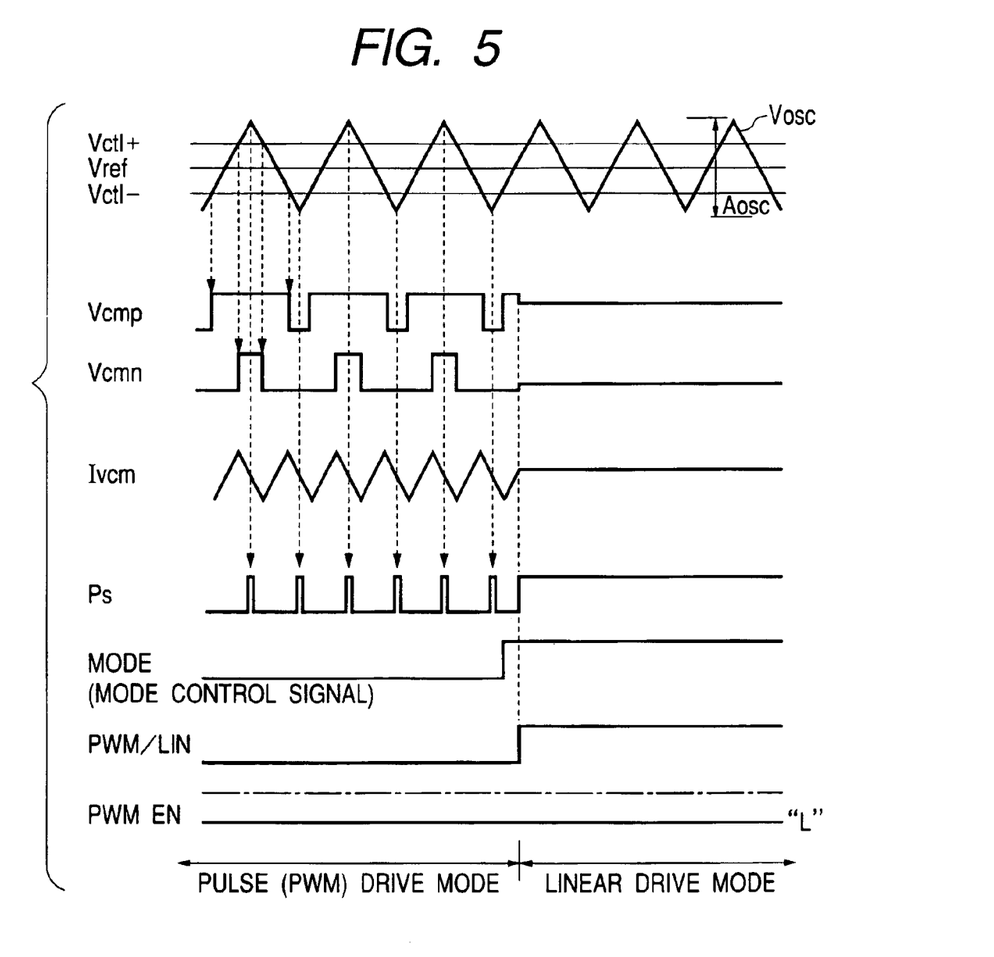
FIG. 5 is a timing chart showing an example of operation of the essential portion when the VCM driver shown in FIG. 4 is switched to the "linear drive mode" from the "pulse drive mode".
Figure 6:
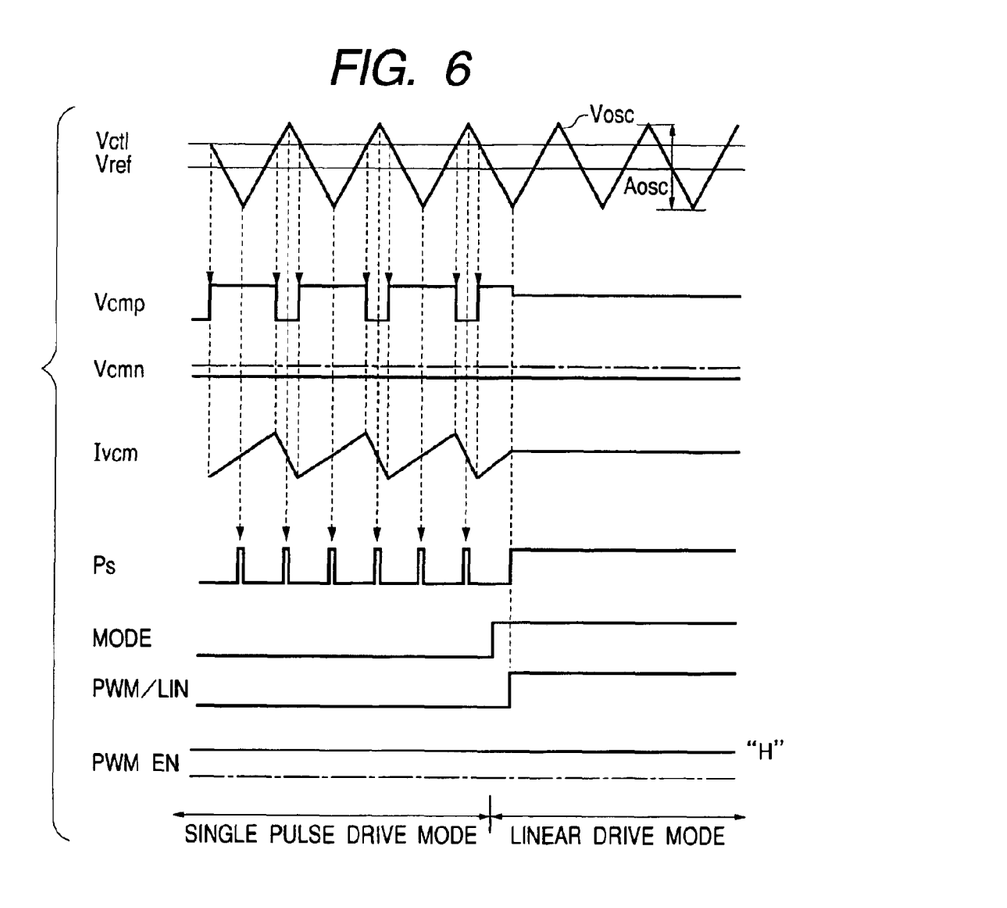
FIG. 6 is a timing chart showing an example of operation of the essential portion when the VCM driver shown in FIG. 4 is switched to the "linear drive mode" from the "single pulse drive mode".

FIG. 4 shows an embodiment of the VCM driver 114. Moreover, FIG. 5 and FIG. 6 are operation timing charts of the essential portion in the VCM driver of FIG. 4.

As shown in FIG. 4, the VCM driver 114 is constructed by a control amplifier 1, PWM comparators 2, 12, output amplifiers 3, 4, a current sense amplifier 5, a sample holding circuit 6, a timing control circuit 7, a latch circuit 8, an amplitude control circuit 9, a triangular wave generating circuit 10, mode change-over switches 13, 14 and an inversion amplifier 15 or the like. Each amplifier 1, 3 to 5 is respectively constructed by an arithmetic amplifying circuit including a differential input and the circuit operation characteristic such as gain can be set respectively to the desired characteristic by determining the constants of elements in the amplifier such as resistors R1 to R14 and transistor to the optimum values.

Moreover, in FIG. 4, DAout is a drive current command value which is given from the controller 260 and is then converted to an analog value in the D/A converter 112, while Vps is a power source voltage and Vref and Vcmref are operation reference voltages of the circuit. Resistors Rx and capacitor Cx connected to the control amplifier 1 are elements for phase compensation and Rs is a resistor for current detection to convert a current flowing to the coil into a voltage Vs. The voice coil motor 108 is indicated as an equivalent circuit using coil inductance Lm, internal resistance Rm and back electromotive force voltage source Vbf.

The control amplifier 1 amplifies a difference between the drive current command value DAout which is converted to an analog signal with the D/A converter 112 and is then inputted via the resistor R1 and the output current Sout which is sampled with the sample holding circuit 6 and is then inputted via the resistor R2 and thereafter outputs a control voltage (control target voltage) Vct1+. This control voltage Vct1+ is inverted by the inversion amplifier 15 to generate the control voltage of inverse polarity Vct1− around the reference voltage Vref.

The PWM comparator 2 compares the levels of the triangular wave signal Vosc outputted from the triangular wave generating circuit 10 and the control voltage Vct1+ to generate a signal Pcmp which changes its pulse width depending on the control voltage Vct1+, namely the pulse signal Pcmp which is PWM modulated by the control voltage Vct1+.

Moreover, the PWM comparator 12 generates the signal Pcmn which changes the pulse width depending on the control voltage Vct1− by comparing the levels of the triangular wave signal Vosc outputted from the triangular wave generating circuit 10 and the control voltage Vct1−, namely the pulse signal Pcmn which is PWM modulated by the control signal Vct1−. As explained above, since the PWM comparator 12 and inversion amplifier 15 are provided, the coil of voice coil motor can be driven from both terminals by deviating the phases of the output Vcmp of one output amplifier 3 and the output Vcmn of the other output amplifier 4 for 180 degrees.

The switch 13 selects any one of the control voltage Vct1+ outputted from the amplifier 1 or the pulse signal Pcmp outputted from the PWM comparator 2 with a PWM/linear change-over signal PWM/LIN generated depending on the mode set to the mode register and then supplies the selected signal to the output amplifier 3. On the other hand, the switch 14 selects any one of the control signal Vcg1+ or the pulse signal Pcmn outputted from the PWM comparator 12 depending on the PWM/Linear change-over signal PWM/LIN generated depending on the mode set to the mode register and the PWM enable signal PWM EN and then supplies the selected signal to the output amplifier 4. Although not particularly restricted, in this embodiment, the PWM/Linear change-over signal PWM/LIN and PWM enable signal PWM EN are inputted to an OR gate 16 to obtain the OR signal as the control signal of the switch 14.

The output amplifiers 3, 4 are voltage drivers in which the predetermined voltage gain is set with the resistors R7 to R14, while the output amplifier 13 is driven with the control voltage Vct1+ or pulse signal Pcmp selected by the switch 13 and the output amplifier 14 is driven with the control voltage Vct1+ or pulse signal Pcmn selected by the switch 14. The coil Lm of the voice coil motor 108 and the resistor Rs for sense are connected in series between the output terminals of the output amplifiers 3, 4 and the drive current Ivcm is applied to the coil of motor with the output amplifiers 3, 4. As explained above, the motor coil is driven in the bothway with a couple of output amplifiers 3, 4. In FIG. 5 and FIG. 6, Vcmp is an output voltage of one output amplifier 3 and Vcmn is an output voltage of the other output amplifier 4, respectively.

Moreover, in this embodiment, the voice coil motor drive current Ivcm is converted to a voltage with a current detection resistor Rs and is then detected with the sense amplifier 5. This conversion voltage Vs (=Rs×Ivcm) is amplified in the voltage gain which may be set by the resistors R3 to R6 in the current sense amplifier 5 and is then inputted to the holding circuit 6. The sample holding circuit 6 samples the current detection voltage Vs in synchronization with a sampling pulse Ps generated by the timing control circuit 7. The timing control circuit 7 detects the peaks (upper peak and lower peak) of the triangular wave signal Vosc and generates the sampling pulse signal Ps for each peak detecting point.

The latch circuit 8 latches and both mode change-over signal PWM/LIN and PWM enable signal PWM EN supplied from the mode register 118 in the serial port in synchronization with the sampling pulse Ps and then outputs these signals. When the "linear drive mode" is designated as the operation mode with the mode change-over signal PWM/LIN and PWM enable signal PWM EN, an output of the timing control circuit 7 is fixed to the high level in synchronization with the subsequent first sampling pulse Ps. Thereby, the sample holding circuit 6 is always set to the sampling condition in which the input signal (current detection voltage Vs) is transmitted as it is and thereby the sampled output current value is then supplied to the control amplifier 1.

Moreover, when the "PWM drive mode" or "single side pulse drive mode" is designated as the operation mode with the mode change-over signal PWM/LIN and PWM enable signal PWM EN, the detected voltage Vs of the drive current flowing into the coil amplified with the current sense amplifier 5 is sampled with the sampling pulse Ps in the intermediate timing of the ON and OFF conditions of the voice coil motor drive current Ivcm. Since the instantaneous value of the voice coil motor drive current Ivcm becomes an average value in this intermediate timing, this average output current value is sampled and is then supplied to the control amplifier 1.

When the "pulse drive mode" is designated with both mode change-over signa PWM/LIN and PWM enable signal PWM EN, the selection terminals (a/b) of the mode change-over switches 13 and 14 are respectively switched to the pulse drive mode side terminal (b) and the switches 13 and 14 respectively select the pulse signals Pcmp and Pcmn outputted from the corresponding comparator 2 or 12 and then supplies the selected signal to the output amplifiers 3 and 4 in order to drive the PWM pulse of the motor coil.

Moreover, when the "linear drive mode" is designated with the mode change-over signal PWM/LIN and PWM enable signal PWM EN, the selection terminals (a/b) of the mode change-over switches 13 and 14 are respectively switched to the linear drive mode side terminal (a) from the pulse drive mode side terminal (b) and thereby the switches 13 and 14 selects the control voltage Vctl+ outputted from the amplifier 1 and then supplies this selected signal to the output amplifiers 3 and 4 in order to realize linear drive of the motor coil.

When the "single side pulse drive mode" is designated with the mode change-over signal PWM/LIN and PWM enable signal PWM EN, the selection terminal (a/b) of the mode change-over switch 13 is switched to the pulse drive mode side terminal (b) to select the pulse signal Pcmp outputted from the comparator 2 and supply this signal to the output amplifier 3, while the mode change-over switch 14 selects the control voltage Vctl+ outputted from the amplifier 1 and then supplies this signal to the output amplifier 4 in order to conduct the signal side pulse drive. Namely, when PWM/LIN and PWM EN are in the low level, the output amplifiers 3 and 4 are PWM driven and when PwM/LIN is in the low level while PWM EN is in the high level, the output amplifier 3 is PWM driven to realize the linear drive of the output amplifier 4.

FIG. 5 shows the timing chart in the case where the seek operation in the "pulse drive mode" is switched to the tracking operation in the "linear drive mode". Moreover, FIG. 6 shows the timing chart in the case where the seek operation in the "single side pulse drive mode" is switched to the tracking operation in the "linear drive mode". Comparison between FIG. 5 and FIG. 6 teaches that change of the coil drive current Ivcm in the "single side pulse drive mode" is less than that in the "pulse drive mode" and thereby the noise to be generated is reduced.

The amplitude control circuit 9 executes the amplitude control to provide the result that the amplitude Aosc of the triangular wave signal Vosc is proportional to the power source voltage Vps. The drive current Ivcm supplied to the voice coil motor 108 from the output amplifiers 3, 4 changes depending on the power source voltage Vps. Therefore, when the output amplifiers 3, 4 are driven with a pulse, if the power source voltage Vps changes, the current drive gain for the pulse width also changes. In order to compensate for this change, the amplitude control circuit 9 controls the amplitude Aosc of the triangular wave signal Vosc in the manner as satisfying the following relationship.

$$Vps/Aosc = R8/R7 = R11/R12 = \text{Constant}$$

When the coil is controlled with the PWM control method as explained above, a detected voltage Vs of the drive current flowing into the coil amplified with the current sense amplifier 5 is sampled with the sampling pulse Ps generated at the peak of the triangular wave signal Vosc in the intermediate timing of the ON and OFF conditions of the voice coil motor drive current Ivcm. In this intermediate timing, the instantaneous value of the voice coil motor drive current Ivcm becomes the average value. Moreover, in this intermediate timing, a kick-back noise due to the ON/OFF conditions of the drive current Ivcm is never generated. Thereby, the PWM control can be realized accurately and stably on the basis of the average value of the voice coil motor drive current Ivcm.

When the coil is driven linearly, control is executed by feeding back continuously the voice coil motor drive current Ivcm to the input side of the amplifier 1 via the hold circuit 6.

Switching to the "linear drive mode from the " pulse drive mode or to the "linear drive mode" from the "single side pulse drive mode" is conducted in synchronization with the sampling pulse Ps. Thereby, this switching is conducted smoothly in the timing that the instantaneous value of the sampling pulse current Ivcm becomes the average value of a PWM period.

Since the pulse drive mode is a sampling system in which the PWM drive is conducted by defining the timing between the average value sampling pulse Ps of the drive current and the next average value sampling pulse Ps as one period, when the voltage gain from the output of the control amplifier 1 to the drive end of the voice coil motor is matched between both drive modes, namely when the loop gains of the systems are matched, the output voltage and drive current Ivcm of the control amplifier 1 are perfectly matched between both drive modes. Accordingly, change in the output during the mode switching can be reduced to zero in principle by switching the drive mode in synchronization with the current sampling pulse Ps.

In the magnetic disc storage apparatus, the magnetic head sometimes enters the reckless driving condition due to the seek operation error. This reckless driving condition can be detected by monitoring a back electromotive force voltage Vbf appearing at the drive terminal of the voice coil motor 108. In the ordinary linear drive mode, the back electromotive force voltage Vbf can be monitored with the drive voltage of the voice coil motor 108 and the drive current flowing into the voice coil motor 108. However, in the case of the PWM drive, since a kick-back noise due to the coil inductance Lm of the voice coil motor 108 (EMI noise due to Ldi/dt) appears at the drive terminal of the voice coil motor, it is impossible to detect in direct only the back electromotive force voltage Vbf from the drive terminal of the voice coil motor 108.

Such problem can be solved, as explained above, by generating the sampling pulse Ps in the intermediate timing in which the kick-back noise is not generated, detecting the average drive current in synchronization with the sampling pulse Ps and representing the drive current of the motor with the output voltage Vct1 of the control amplifier 1 which is the designated value of the average value output in one period of PWM of the drive voltage of the voice coil motor. In the case of the circuit of the embodiment shown in FIG. 4, the voltage (Vsout) reflecting the back electromotive force voltage Vbf explained above is extracted from the output Sout of the sample holding circuit 6 and the voltage corresponding to the motor drive voltage is extracted from the output Vct1 of the control amplifier 1 and these voltages are supplied to the back electromotive force voltage detecting circuit 115 for the purpose of monitoring.

Figure 8:
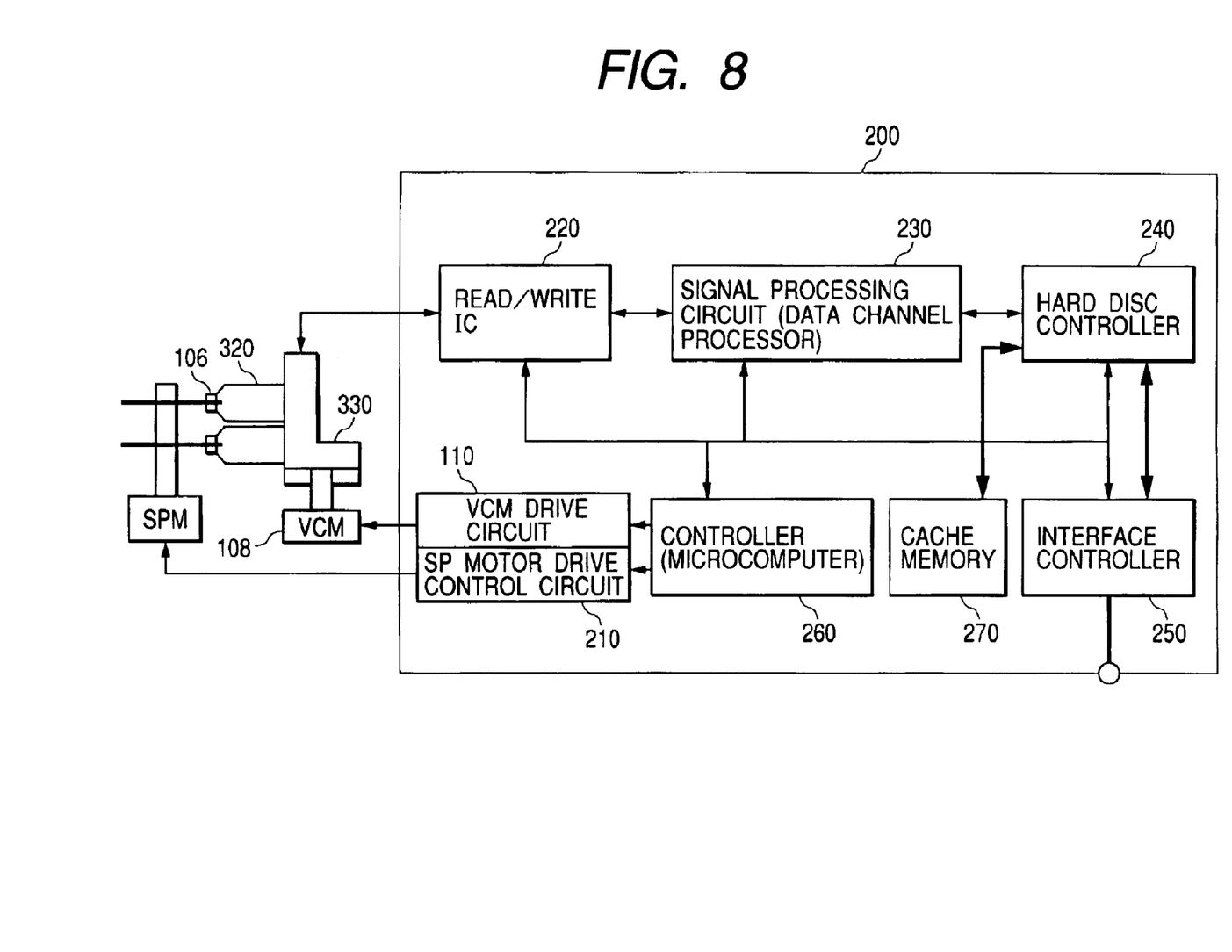
FIG. 8 is a block diagram showing an example of the total construction of the hard disc storage apparatus as an example of the system using a motor drive control circuit to which the present invention is applied.

FIG. 8 is a block diagram of an example of construction of the entire part of the hard disc apparatus as an example of the magnetic disc storage apparatus including the spindle motor control system and magnetic head drive control system using the motor drive control circuit to which the present invention is adapted.

In FIG. 8, numeral 320 designates an arm including the magnetic head 106 (including a write magnetic head and a read magnetic head) at the end part thereof; 330, a carriage for holding the arm 329 to rotate. The voice coil motor 108 moves the magnetic head by moving the carriage 330 and the voice coil motor drive circuit 110 executes the servo control of the voice coil motor 108 in combination with the controller 260 in order to set the center of magnetic head to the center of the track.

Moreover, numeral 210 designates a spindle motor drive control circuit for controlling the drive of spindle motor 310 which drives a magnetic disc to rotate at the predetermined velocity. This spindle motor drive control circuit 210 operates depending on a control signal such as the current command value SPNCRNT supplied from the controller 260 consisting of a microcomputer and executes the servo control for the spindle motor 310 to provide a constant relative velocity of the magnetic head.

Numeral 220 designates a read/write IC which amplifies a current depending on change of magnetism detected with the magnetic head 106 and transmits a read signal to a signal processing circuit (data channel processor) 230 or amplifies the write pulse signal from the signal processing circuit 230 and outputs the drive current of the magnetic head 106. This read/write IC is provided at an arm to hold the magnetic head 106, for example, in the system of FIG. 1.

Numeral 240 designates a hard disc controller for fetching a read data transmitted from the signal processing circuit 230 to conduct the correcting process and outputting a write data to the signal processing circuit 230 by conducting also the error correction encoding process to the write data sent from a host. The signal processing circuit 230 executes the signal process such as waveform shaping or the like considering the modulation/demodulation process and magnetic storage characteristic suitable for the digital magnetic recording method and also reads position information from the readout signal from the magnetic head HD.

Numeral 250 designates an interface controller for conducting exchanges of data and control or the like between this system and an external apparatus. The hard disc controller 240 is connected to a host computer such as a micro computer of the personal computer body via the interface controller 250. Numeral 270 designates a cache memory for buffer to temporarily store a read data read from the magnetic disc at a high speed. A system controller 260 consisting of the microcomputer judges an operation mode based on the signal from the hard disc controller 240 to control each part of the system corresponding to the operation mode and also calculates a sector position based on the address information supplied from the hard disc controller 240.

As explained above, since the motor drive circuit of this embodiment is provided with the mode for PWM drive of both terminals of the coil, the mode for linear drive of both terminals of the coil and the mode for PWM drive of one terminal of the coil and linear drive of the other terminal thereof, high speed access in the seek operation and optimization of control of EMI noise can be realized while the power loss is controlled by selecting these operations modes depending on the system. Moreover, as will be explained later, influence of noise can further be reduced by introducing a certain idea to the cable connecting the voice coil motor 108 provided in the head side, read/write IC (220), motor drive IC (110) and signal processing IC (230).

In other words, a flexible printed wiring cable which is generally called an FPC is used to connect between the voice coil motor 108 and motor drive IC (110) and between the read/write IC (220) and signal processing IC (230) and this cable is branched in the course of wiring for coupling respective elements. Therefore, this cable is provided adjacently with the wires for connecting the voice coil motor 108 and motor drive IC (110) and also connecting the read/write IC (220) and the signal processing IC (230).

Figure 7:
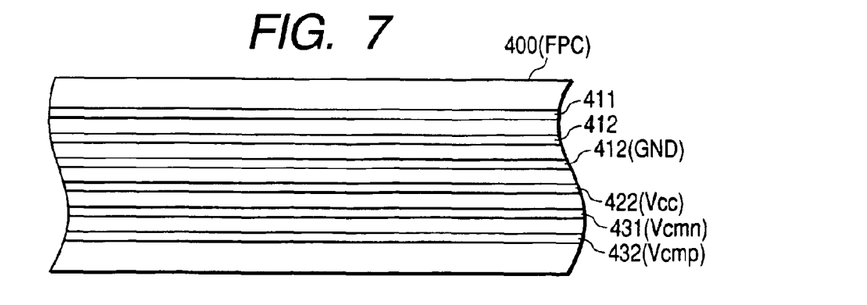
FIG. 7 is an expanded explanatory diagram showing an example of construction of the cable for connecting the head side and the controller side in the magnetic disc storage apparatus to which the present invention is applied.

In the case explained above, when the motor drive IC (110) is provided, as explained above, with the single side pulse drive mode for the linear drive of one terminal of the coil and the PWM drive of the other terminal of the coil, the wires 411, 412 for connecting the read/write IC (220) and signal processing IC (230) and the wires 431, 432 for connecting the voice coil motor 108 and motor drive IC (110) are disposed in separation on the cable 400, for example, as shown in FIG. 7, the power source wires (Vcc line and GND line) 421, 422 are also disposed between above wires and the wire 431 at the internal side of the wires 431, 432 connecting the voice coil motor 108 and motor drive IC (110) is used for transfer of an output Vcmn of the output amplifier 4 in the side of the linear drive in the single side pulse drive mode.

Thereby, since the wire 431 is never driven with the PWM drive even when the drive is changed, the voltage does not change to a large extent and noise generated from this wire is less than the noise generated from the external wire 432. Therefore, amount of noise entering the wires 411, 412 connecting the read/write IC (220) and signal processing IC (230) can be reduced.

During the seek operation in which the motor drive circuit is operated in the single side pulse drive mode, the track information is read and is then transmitted to the signal processing IC (230) for the position control of head. However, since the write signal is generally not transmitted in this seek operation, it is preferable in the example of FIG. 7 to transmit the read signal using the wire 411 which is furthest from the wire 432 used for transmission of the output Vcmn of the output amplifier 4. Moreover, since the GND line is generally more stable than the Vcc line in regard to the power source voltage, it is preferable in the example of FIG. 7 to use the wire 421 near the wires 411, 412 which are used for the write signal and read signal.

The present invention has been explained practically on the basis of the preferred embodiments thereof and moreover the present invention is not limited to the above embodiments and allows various changes or modifications within the scope of the claims. For example, the motor drive circuit including the three operation modes of the "linear drive mode", "pulse drive mode" or "single side pulse drive mode" has been explained in above embodiments, but it is also possible that the motor drive circuit is provided with only two drive modes of the "linear drive mode" and "single side pulse drive mode" and thereby the motor is driven in the "single side pulse drive mode" for the seek operation or in the "linear drive mode" for the tracking mode. In this case, it is also possible to form the construction that the PWM comparator 12 and switch 14 in the embodiment of FIG. 4 are eliminated and an output of the control amplifier 1 is inputted in direct to the output amplifier 4. It is because the Vcmn side is controlled linearly in any operation mode.

In addition, a user is requested to select the "pulse drive mode" or "single side pulse drive mode" in the seek operation, but this selection may also be realized by previously comprising the selection information as the mode information into the control program and moreover by providing the construction that a fuse is cut off corresponding to the mode to be set in the stage of manufacture by previously providing a programmable element such as the fuse.

In above embodiment, an example has been explained in which the present invention is adapted to the magnetic disc storage apparatus using a hard disc as the storage medium as the application field of the background of the invention. However, the present invention is not restricted thereto and can also be applied to the magnetic disc storage apparatus using a floppy disc as the storage medium.

The effect of the typical inventions disclosed in the present invention will be briefly explained as follows.

Namely, during the tracking operation in which amount of movement of the magnetic head is rather small, higher positioning accuracy can be obtained with linear control of the voice coil motor drive current. Meanwhile, during the seek operation in which amount of movement of the magnetic head is large, the magnetic head can be moved at a high speed without a large power loss by the PWM control of the voice coil motor drive current. In addition, it is also possible to select, with priority for effective reduction depending on the system to be applied, any one of heat generation and EMI noise which are presumed to induce a read/writer error. Moreover, the present invention also provides the effect that high accuracy positioning control of the magnetic head during the tracking operation and high speed access by reduction of the seek time can be attained simultaneously.

What is claimed is:

1. A magnetic disc storage apparatus comprising:
   a magnetic head for reading information from storage tracks on a magnetic disc driven to rotate;
   a voice coil motor for moving said magnetic head over said magnetic disc; and
   a magnetic head driving circuit for controlling positioning of said magnetic head and for executing a first drive mode and a second drive mode by feedback control in connection with a drive current of said voice coil motor while monitoring a read condition of said magnetic head,
   wherein said magnetic head driving circuit drives both terminals of a coil of said voice coil motor with linear control in said first drive mode, and drives one terminal of said coil with linear control and the other terminal of said coil with pulse width control in said second drive mode,
   wherein said magnetic head driving circuit executes said first drive mode during a tracking operation in which said magnetic head sequentially scans a plurality of adjacent storage tracks on said magnetic disc and also executes said second drive mode during a first seek operation in which an amount of movement of maid magnetic head is larger than an amount of movement of said magnetic head during a second seek operation.

2. A magnetic disc storage apparatus according to claim 1,
   wherein said magnetic head driving circuit executes said first drive mode when a control command value in connection with said drive current of said voice coil motor is less than a predetermined threshold value and also executes said second drive made when said control command value is equal to or higher than said predetermined threshold value,
   wherein said first drive mode is executed during said second seek operation when said control command value is smaller than said predetermined threshold value.

3. A magnetic disc storage apparatus according to claim 1,
   further comprising a flexible printed wiring cable including:
   a first wiring for transmitting a first signal read out by said magnetic head;
   a second wiring for transmitting a second signal to write predetermined data to said magnetic disc; a third wiring for transmitting a third signal to check drive one terminal of said coil; and
   a fourth wiring for transmitting a fourth signal to drive the other terminal of said coil,
   wherein a region includes said first and second wiring on said flexible printed wiring cable,
   wherein said third wiring is between said region and said fourth wiring.

4. A magnetic disc storage apparatus according to claim 3,
   wherein a fifth wiring for supplying a power source voltage to said voice coil motor on said flexible printed wiring cable is between said region arid said fourth wiring.

5. A magnetic disc storage apparatus comprising:
   a magnetic head for reading information from storage tracks on a magnetic disc storage disc driven to rotate;
   a voice coil motor for moving said magnetic head over said magnetic disc; and
   a magnetic head driving circuit for controlling a position of said magnetic head by feedback control in connection with a drive current of said voice coil motor while monitoring a read condition of said magnetic head,
   wherein said magnetic head driving circuit is provided with a first drive mode for driving both terminals of a coil of said voice coil motor with linear control, a second drive mode for driving one terminal of said coil with linear control and the other terminal of said coil with pulse width control and a third drive mode for driving both terminals of said coil with said pulse width control in order to execute said feedback control in connection with the drive current of said voice coil motor in any one mode of an operation mode including said first drive mode, said second drive mode and said third drive mode, wherein said magnetic head driving circuit executes said first drive mode during a tracking operation in which said magnetic head sequentially scans a plurality of adjacent storage tracks of said magnetic disc, wherein said magnetic head driving circuit executes either said second drive mode or third drive mode during a first seek operation in which an amount of movement of said magnetic head is larger than an amount of a movement of said magnetic head during a second seek operation.

6. A magnetic disc storage apparatus according to claim 5, wherein said magnetic head driving circuit executes said first drive mode when a control command value in connection with said drive current of said voice coil motor is less than a predetermined threshold value, wherein said magnetic head driving circuit executes either said second drive mode or said third drive mode during said first seek operation when said control command value in connection with said drive current of said voice coil motor is equal to or higher than said predetermined threshold value, wherein said first drive mode is executed during a second seek operation when said control command value is smaller than said predetermined threshold value.

7. A magnetic disc storage apparatus according to claim 5, further comprising a timing control circuit for determining a timing for setting an instantaneous value of said drive current of said voice coil motor to an average value thereof, wherein said first and second drive modes are adapted to be switched in synchronization with said timing determined by said timing control circuit, wherein said first and third drive modes are adapted to be switched in synchronization with said timing determined by said timing control circuit.

8. A magnetic disc storage apparatus according to claim 5 further comprising:

a current detecting circuit for detecting an average value of said drive current of said voice coil motor through a voltage conversion;

an error detecting circuit for detecting a difference between a detected voltage of said current detecting circuit and a control command value;

a first pulse width modulator for generating a first pulse a width of which changes depending on a detected output of said error detecting circuit;

a second pulse width modulator for generating a second pulse which is different in a phase from said first pulse based on the detected output of said error detecting circuit;

a first driving circuit for controlling, from a side of one terminal of said coil, said drive current of said voice coil motor based on said detected output of said error detecting circuit or said first pulse generated by said first pulse width modulator;

a second driving circuit for controlling, from a side of said other terminal of said coil, said drive current of said voice coil motor based on said detected output of said error detecting circuit or said second pulse generated by said second pulse width modulator;

a first switch circuit which can supply said detected output of said error detecting circuit or said first pulse to said first driving circuit through a first witching operation depending on said operation mode; and a second switch circuit which can supply said detected output of said error detecting circuit or said second pulse to said second driving circuit through a second switching operation based on said operation mode.

* * * * *